Dec. 10, 1940.　　　L. E. MORROW　　　2,224,795
AGRICULTURAL MACHINE
Filed July 6, 1939　　　3 Sheets-Sheet 1
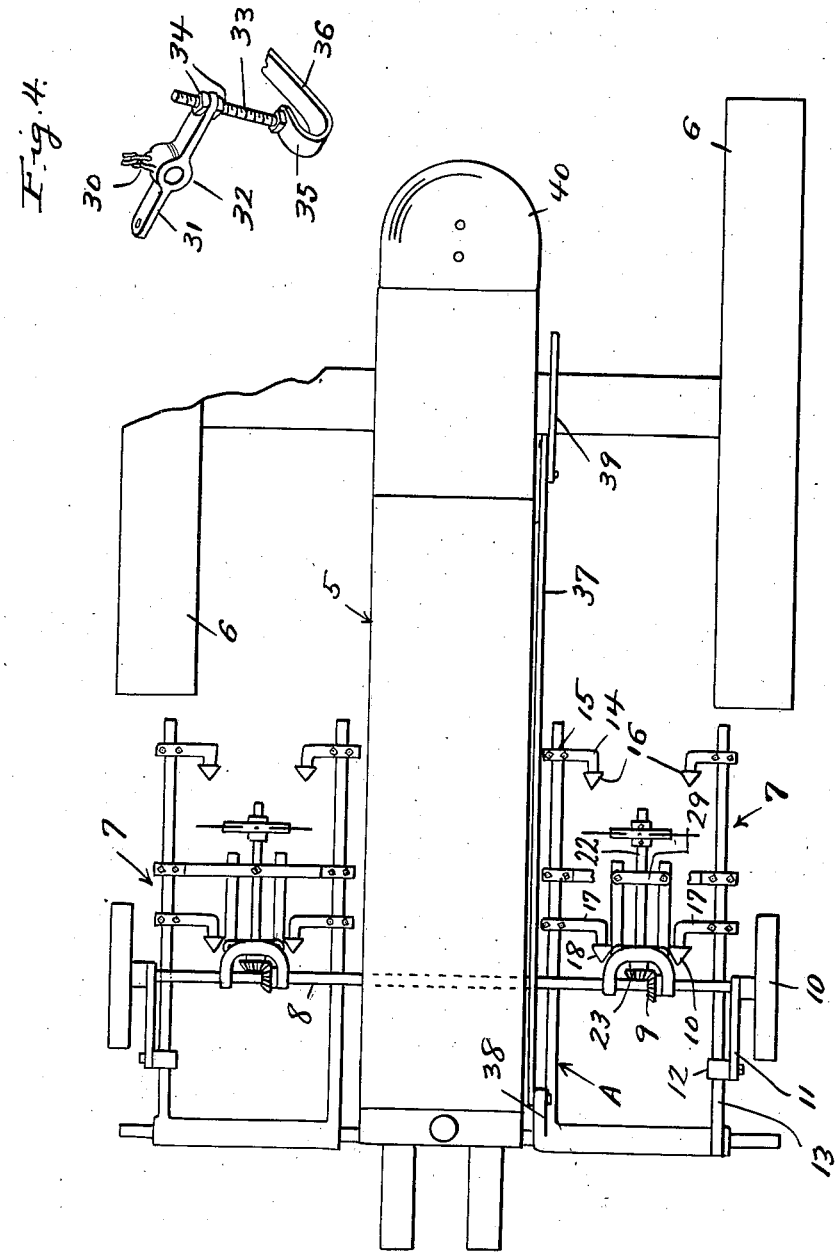
Inventor
Lloyd E. Morrow
By Clarence A. O'Brien
and Hyman Berman
Attorneys

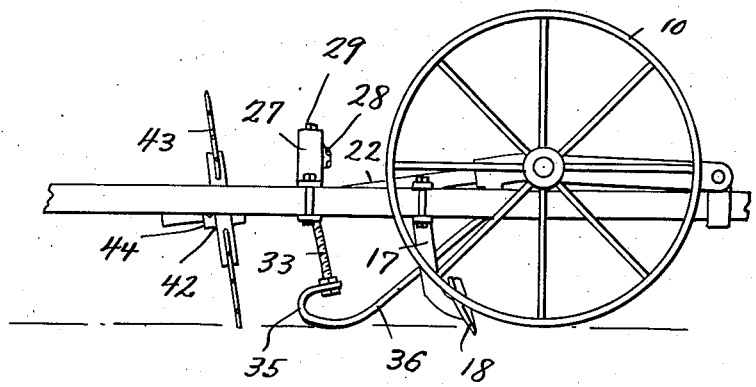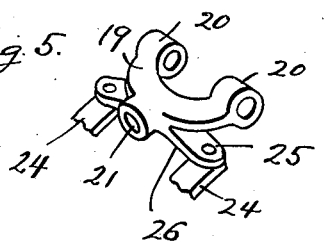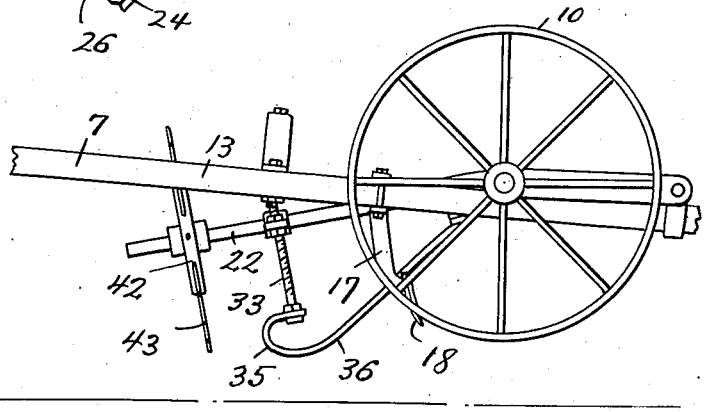

Dec. 10, 1940.                L. E. MORROW                2,224,795
                          AGRICULTURAL MACHINE
                           Filed July 6, 1939            3 Sheets-Sheet 3
Fig. 6.
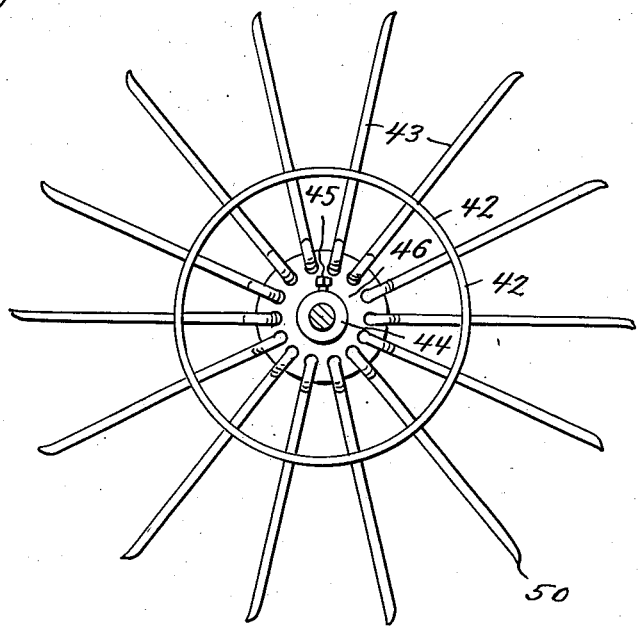
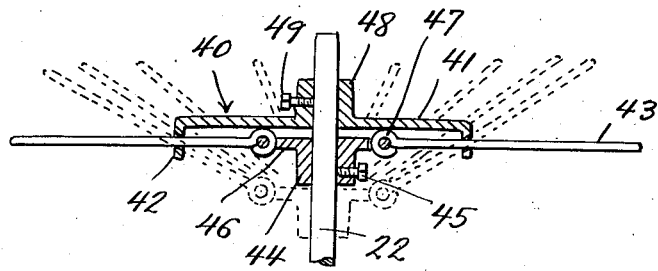
Fig. 7.
Inventor
Lloyd E. Morrow
By Clarence A. O'Brien
and Hyman Berman
Attorneys Patented Dec. 10, 1940

2,224,795

UNITED STATES PATENT OFFICE 2,224,795

AGRICULTURAL MACHINE

Lloyd E. Morrow, Milan, Ohio

Application July 6, 1939, Serial No. 283,058

4 Claims. (Cl. 97—38)

This invention appertains to new and useful improvements in agricultural machines and more particularly to a row tiller, the principal object of the invention being to till rows of growing crops between the plants in such a manner as to not harm the plants, but to fairly loosen up the soil at all positions around the plants.

Another important object of the invention is to provide a row tiller which is of simple but positive acting construction and not susceptible to the ready development of defects.

Other objects and advantages of the invention will become apparent to the reader of the following specification.

In the drawings—

Figure 1 represents a top plan view of the machine.

Figure 2 is a fragmentary side elevational view.

Figure 3 is a fragmentary side elevational view of the machine in adjusted position.

Figure 4 is a fragmentary perspective view of the suspending bracket for the cross tiller.

Figure 5 is a fragmentary perspective view of the swingable bracket for the cross tiller.

Figure 6 is a rear elevational view of the cross tiller.

Figure 7 is a cross-sectional view of the cross tiller.

Referring to the drawings wherein like numerals designate like parts, it can be seen that numeral 5 generally refers to a conventional tractor having the power wheels 6—6.

The present invention is generally referred to by numeral 7 and is repeated on each side of the tractor. A description of one of these assemblies will suffice for both.

Numeral 8 denotes the shaft which extends under the forward portion of the tractor 5 and carries a bevel gear 9 for each corresponding assembly 9. This shaft 8 at each end thereof has the ground-engaging wheel 10. The ends of the shafts 8 are supported by the rear ends of the arms 11 which extend from the adjustable collars 12 on the outboard arms 13 of the frames generally referred to by A.

Describing one of these assemblies in detail, it can be seen that at the rear ends of the arms 13 depending arms 14 are clamped as at 15 to the arms 13 and are equipped with ground-engaging cultivator members 16.

More forwardly on the arms 13 are the depending arms 17 and their shovels 18.

Straddling the bevel gear 9 on the corresponding end portion of the shaft 8 is the U-shaped swingable bracket 19 the collars 20 of which have the shafts 8 extending therethrough. The intermediate portion of the bracket 19 is thickened and bored as at 21 and through this extends the shaft 22, this shaft 22 being provided at its forward end, within the confines of the bracket 19, with the bevel gear 23 which meshes with the bevel gear 9. Bars 24—24 are secured as at 25 to laterally disposed ears 26 on the bracket 19 and these bars 24 are bridged at their rear end portions by the overlying inverted U-shaped bridge member 27. A chain 28 extends downwardly from the anchoring member 29 on the bridge member 27 and connects to the eye 30 on the cross-bar 31, this bar being provided with a central bearing 32 through which the shafts 22 extend.

Disposed downwardly through the ends of the cross-member 31 are the threaded rods 33, equipped with jamb nuts 34 to regulate the extent of the threaded members 33 through the cross-members 31.

The lower ends of these threaded members 33 are connected to the up-turned end portion 35 of the lead spring ground riding rudders 36.

An elongated connecting rod 37 extends from the levers 38 on the frame 8 to a hand lever 39 adjacent the driver's seat 40 so that the assemblies can be raised or lowered whenever desired.

The cross tiller unit is generally referred to by numeral 40 and consists of the disk 41 having the laterally disposed circumferentially extending flange 42 through which openings are formed and through these openings are slidably disposed the tines 43. A hub 44 is slidably disposed on the corresponding shaft 22 and is retained in adjusted position by a set screw 45.

Said collar 44 has the circumferential flange 46 apertured to receive the eyes 47 at the inner ends of the tines 43.

The disk 41 has the hub 48 which is held in place on the corresponding shaft 22 by a set screw 49.

Obviously by loosening the set screw 45 or the set screw 47, the plate 41 or the collar 44 can be adjusted one way or the other on the shaft 22 so as to properly dispose the tines 43 such as to the adjusted position shown in dotted lines in Figure 7.

As shown in Figure 6, the outer ends of the tines are slightly tipped as at 50 in the direction of rotation of the tiller.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. An agricultural machine comprising a wheeled frame, cultivating means carried by the frame and a cross tiller operative in conjunction with the said cultivators, said cross tiller consisting of a rotor provided with a plurality of radially disposed tines, and means whereby the tines can be adjusted in oblique relation with respect to the axis of the rotor.

2. An agricultural machine comprising a wheeled frame, cultivating means mounted on the frame, a cross tiller operative in conjunction with the said cultivating means, said cross tiller consisting of a collar provided with a plurality of tines swingably mounted thereon, a shaft, a disk on the shaft having guide means thereon for the tines, said collar being adjustable on the shaft to move the tines from an oblique to a radial position with respect to the shaft, said guide means consisting of a laterally disposed flange on the disk having openings therein for slidably receiving the tines.

3. An agricultural machine comprising a wheeled frame, cultivating means mounted on the frame, a cross tiller operative in conjunction with the said cultivating means, said cross tiller consisting of a collar provided with a plurality of tines swingably mounted thereon, a shaft, a disk on the shaft having guide means thereon for the tines, said collar being adjustable on the shaft to move the tines from an oblique to a radial position with respect to the shaft, said guide means consisting of a laterally disposed flange on the disk having openings therein for slidably receiving the tines, said disk having a hub portion provided with removable detent means engageable with the shaft.

4. An agricultural machine comprising a wheeled frame, cultivating means mounted on the frame, a cross tiller operative in conjunction with the said cultivating means, said cross tiller consisting of a collar provided with a plurality of swingably connected tines, said tiller further consisting in the provision of a disk, a drive shaft to which the disk is secured and guide means at the periphery of the disk through which the tines are disposed, said collar being movable longitudinally of the axis of the disk to move the tines from an oblique position with respect to the axis to a radial position with respect thereto.

LLOYD E. MORROW.